Nov. 29, 1966      J. GOLDMAN ETAL      3,288,110

AQUARIUM SEPARATOR

Filed Oct. 14, 1964

INVENTORS
JEROME GOLDMAN
MARVIN GOLDMAN
JERRY ROSEN

BY Edith T. Grill

ATTORNEY

United States Patent Office 3,288,110
Patented Nov. 29, 1966

1

3,288,110
AQUARIUM SEPARATOR
Jerome Goldman, 80—15 41st Ave., Jackson Heights, Queens, N.Y.; and Marvin Goldman and Jerry Rosen, both of 79—19 149th Ave., Howard Beach, Queens, N.Y.
Filed Oct. 14, 1964, Ser. No. 403,774
3 Claims. (Cl. 119—5)

The present invention relates to improvements in aquariums and more particularly to perforated separators therefor as hereinafter described and claimed.

The use of plastic or glass dividers in aquariums is well known. However, their presence has necessitated the use of separate filter systems and heating systems for each compartment formed by said dividers. In other words, the two or more compartments formed by the aforesaid dividers function as individual tanks of smaller dimensions. The consequent utilization of necessary apparatus in duplicate, triplicate, etc. serves to clutter the aquarium and render it unsightly. Furthermore, the use of glass dividers entails the necessity of cutting the glass to the exact size of the width of the aquarium. If the glass divider is only slightly oversize, the forcing of said divider creates leakage in the tank. Similarly, if said divider is only slightly undersize, baby fish can swim through said slight opening. Since no two aquariums are exactly alike, said slight difference renders it impossible to obtain an exact fit with standardized dividers. Thus it is evident that prior art aquarium dividers or separators have multiple inherent defects and inconveniences in installation, removal, etc., It has now been found that the foregoing disadvantages and defects can be overcome by the present novel perforated separator or divider adapted for use in combination with the aquarium.

Accordingly, it is a principal object of the present invention to provide a perforated separator for use with an aquarium which results in a tight and secure seal.

It is another object of this invention to provide an aquarium comprising a separate area for baby fish without using separate heating and/or filtering systems.

Another object of this invention is to provide a substantially invisible, non-toxic, plastic separator for aquariums.

Still another object of the invention is to provide a divider or separator for aquariums which permits unrestricted filtration and complete heater circulation therein.

A further object of this invention is to provide a separator with specific channeling which can be set up in seconds to convert one aquarium into two or more.

Another object of this invention is to provide a specific channel which allows for variations in size of the separating plate.

Still another object of this invention is to provide an aquarium divider which instantly separates rough fish from peaceful ones and protects expensive plants from algae eating fish.

Other and further objects and advantages will be manifested from the following description when taken in conjunction with the annexed drawings.

To the accomplishment of the foregoing and related ends, the present invention then consists of the means hereinafter fully described and particularly pointed out in the claims, the annexed drawings and the following description setting forth in detail certain means in carrying out the invention, such disclosed means illustrating, however, but several of the various ways in which the principles of the invention may be employed.

Broadly stated the invention relates to a tank-divider apparatus comprising essentially a perforated, non-toxic semi-rigid plastic plate which is inserted between a pair of plastic channels secured to opposite sides of an aquarium by a pair of clips. A stiffener may be superimposed onto said perforated plate to afford additional rigidity thereto. The perforated plate and channel combination afford a tight and secure seal heretofore unattainable.

The present invention is illustrated by way of example in the accompanying drawings in which.

Figure 1:
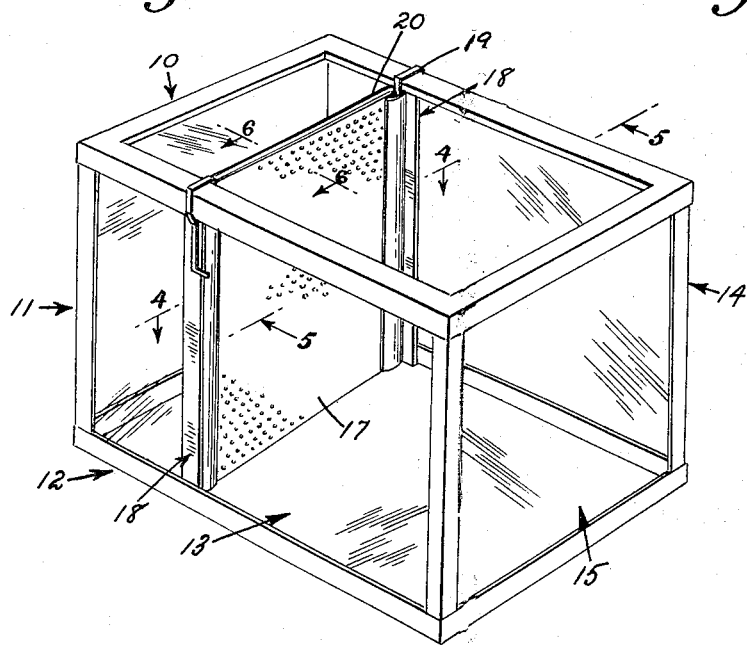
FIGURE 1 is a perspective view of the separator apparatus comprising the plate, channel and clip in combination with an aquarium.

Referring to the drawings in detail, and FIGURE 1, particularly, the aquarium tank 10 comprises a front supporting frame section 11, base 12, and rear frame section 14 with transparent front and rear sides 13 and end panels 15 so as to form a suitable water tight receptacle which is to be filled with water to the desired level and to contain the exhibits such as aquatic plants, reptiles and animals, particularly fish. The aquarium tank 10 is illustrated as rectangular, although any shape can be utilized. Sides 13 and panels 15 are preferably glass or other transparent material. The bottom and side panels may be of an opaque or translucent character if desired. It is understood that frame 11 is composed of any suitable rigid material such as painted or stainless steel, plastic, aluminum, etc. The corners are securely joined in the usual manner, preferably to form right angles. The glass plates fit into cleats, guides or tracks in the usual manner so as to form a rigid frame. It is understood that the invention is applicable to aquaria of any shape or design and in a variety of sizes.

Figure 7:
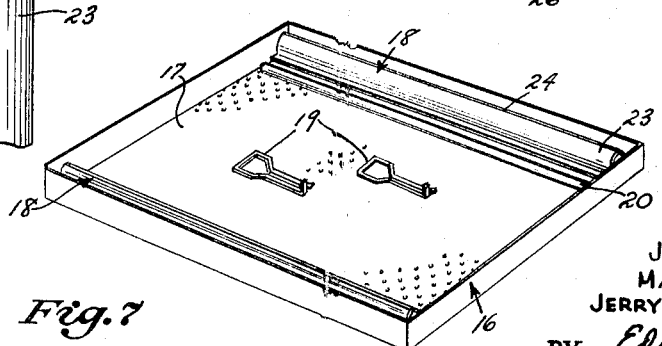
FIGURE 7 is a perspective view of the tank divider apparatus as packaged comprising the perforated plate, the two channels, the two clips and the stiffener.

The tank-divider apparatus 16, illustrated in FIGURE 7, comprises essentially a perforated, non-toxic semi-rigid plastic plate 17, which is inserted between a pair of plastic channels 18, secured to front and rear sides 13 of aquarium 10 by clips 19, thereby dividing said aquarium in two. The tank divider apparatus 16 may also be inserted between the end panels 15 to subdivide rectangular aquarium 10 lengthwise, although this is not usually preferred. A stiffener 20, which is in the form of an elongated, rigid, plastic clip, may be superimposed on the top of perforated plate 17 to afford additional rigidity to said plate and act as a handle for sliding plate 17 within channels 18.

Plate 17 is made from a non-toxic thermoplastic material such as polystyrenes, ethylene, propylene, etc, and vinyls. Cellulose acetate and/or butyrate cannot be utilized because of their toxicity towards fish such as guppies. Plate 17 may be transparent, translucent, opaque or tinted. While the transparent plate is less visible within the aquarium, the algae which forms in the water under normal usage tends to give a blotchy appearance to said plate. Consequently, a slight green tint imparts body to said plate as well as eliminates the blotchy appearance of the clear plate. The aforesaid green tinted plate blends with the color of the water contained within the aquarium and masks the presence of algae normally found therein. Plate 17 is preferably semi-rigid, but may be flexible or rigid. Semi-rigidity is preferred because it affords greater tensile strength and greater toughness to said plate as well as resists cracking during usage. The thickness of plate 17 is preferably .035 to .075 inch, so as to permit easy perforation thereof, the heavier sheet being more difficult to perforate. Dow's 475 Hi-Impact styrene or equivalent has been found to be particularly desirable in making plate 17 since it possesses all the aforementioned properties plus a minimal water absorptive property, a maximum of 1%. The non-absorptic nature of the styrene plastic sheet eliminates distortion thereof, even after prolonged usage within an aquarium. Consequently, plate 17 is durable for prolonged periods of time without warping. It has been found that the perforations 21 on plastic sheet 17 are preferably round, although other shapes such as square, oval, oblong, etc. are embraced within the scope of the present invention. Even slits in varying lengths may be used. Plate 17 contains approximately 32 perforations per square inch, each perforation having a diameter of about .057 to .059 inch. Consequently, a plate of 11¾ square inches, which is customarily used in a 15 gallon aquarium has approximately 2000 to 2025 perforations. The dimensions of perforations 21 are suitable to prevent clogging thereof with algae and are small enough to prevent baby fish from swimming through. If the perforations are too small in diameter such as .01 to .05 inch, there is danger of clogging and incomplete circulation. The space between the perforations must be greater than the diameter of the perforations in order to prevent curling or cracking of the plastic sheet or plate. The open area of plate 17 is approximately 8.5% of the total area. The numerous perforations 21 on plate 17 permit free and complete circulation of the water between compartments. This was tested by placing dye in one compartment and watching it flow through perforations 21 until both compartments were alike. Fish do not swim into the plate 17 since they are not attracted to said plate. A very useful feature of plate 17 is its ability to be cut with a scissors or a hot knife to fit into a variety of different size aquariums.

Figure 2:
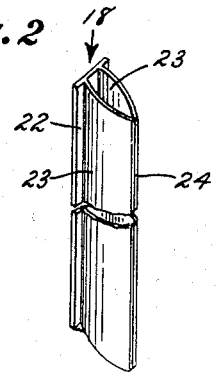
FIGURE 2 is a perspective view of the channel of said separator apparatus.

Perforated plate 17 slides into channels 18 disposed on opposite walls of aquarium 10 to subdivide said aquarium. Channels 18 may be composed of any non-toxic rigid material such as stainless steel, plastic, etc. However, a rigid non-toxic plastic is preferable because it is more economical, easier to work with and more attractive. The rigid, non-toxic plastic channel may be clear or tinted, the slight green tint being preferable because it blends with the color of the algae and the water in the tank. Channel 18 as specifically illustrated in FIGURE 2, comprises a flat strip 22 about 0.5–0.75 inch wide which fits against the inner surface of panel 13 of aquarium 10 below metal frames 11 and 14, a pair of slightly concave arms 23 extending perpendicularly from strip 22 and meeting at linear opening or slit 24. Arms 23 are about 0.5 to 1.0 inch wide, and slit 24 is slightly smaller than the thickness of plate 17, so that slight pressure is needed when inserting plate 17 between arms 23. This insures a secure and tight seal between plate 17 and arms 23 of channel 18, so that there is no danger of plate 17 slipping out of arms 23. The aforementioned disadvantageous condition of slippage was obviously prevalent with the prior art U-channel plastic strips because of the lack of the aforesaid gripping action. Another advantage of the present channel 18 resides in the extra width of arms 23 as compared to the prior art U-channel strips, thereby allowing for slight variations in the size of individual aquariums, whereas the prior art required an exact fit.

Figure 3:
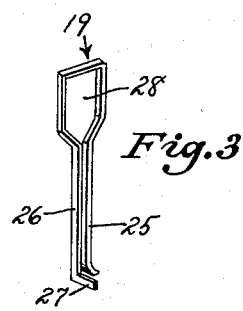
FIGURE 3 is a perspective view of the clip of said separator apparatus.
Figure 4:
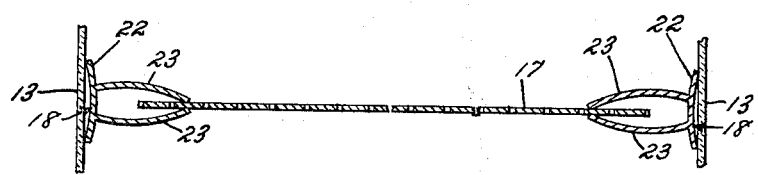
FIGURE 4 is a cross-sectional view of the aquarium of FIGURE 1 seen along lines 4—4.
Figure 5:
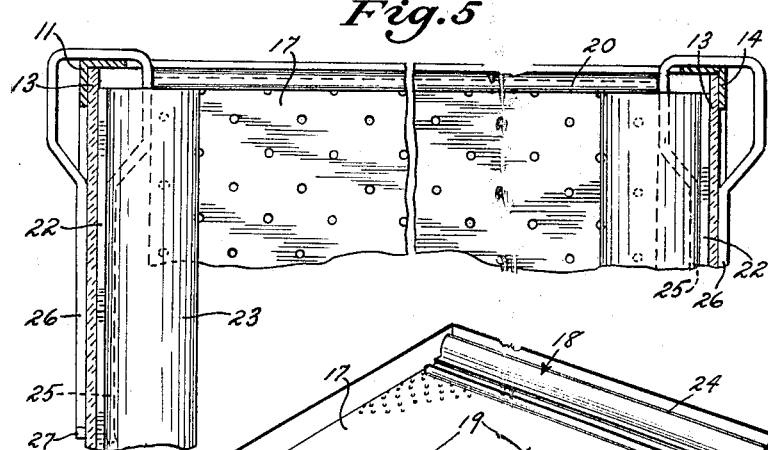
FIGURE 5 is a cross-sectional view of the aquarium of FIGURE 1 seen along lines 5—5.
Figure 6:
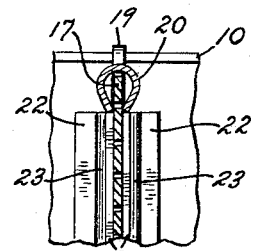
FIGURE 6 is a cross-sectional view of the aquarium of FIGURE 1 seen along lines 6—6.

Rigid channel 18 is slightly convex, as shown by FIGURE 4, and when wet, adheres firmly to panels 13, said convexity creating suction whereby said channel resists being pulled away from panel 13. Leg 25 of clip 19 is inserted between arms 23 of channel 18, and leg 26 snaps against the outside surface of panel 13 to further enhance the firm adherence of channel 18 to panels 13. Leg 26 may be bent at right angles at its lower extremity to prevent the clip from turning, perpendicular extension 27 acting as a brace for clip 19. FIGURE 3, specifically illustrates the structure of clip 19 which is supplied with an enlarged head 28 to fit over frames 11 and/or 14. Clip 19 may be made out of any non-toxic rigid material, stainless steel being preferable because of its non-toxicity, durability, etc. Spring steel is preferred because of its resilience and ability to function as a clamp, the tension created by said resiliency being transmitted the full length of channel 18, whereby said channel continuously and firmly adheres to panel 13. It is also preferable to use round wire for clip 19 because it eliminates sharp corners which may scratch or cut glass panels 13, channel 18 and all other structures in contact therewith, as well as the fingers or persons manipulating or installing the present tank-divider.

Stiffener 20, which is in the form of a rigid, hollow, elongated tube having a slit running the full length of said tube, may be clamped onto plate 17 via said slit, to afford additional rigidity to plate 17 as well as provide a handle for inserting and removing plate 17 from channel 18. It is preferable to use a clear or tinted, rigid, non-toxic plastic material for stiffener 20.

Although the present invention has been described with respect to certain embodiments, it is apparent that various modifications and changes may be made without departing from the true scope and spirit of the present invention as defined by the following claims.

What is claimed is:

1. A tank divider accessory adapted to be removably positioned within an aquarium and to connect a pair of opposite walls of said aquarium to form separate compartments having free and complete water circulation therebetween, which comprises essentially a non-absorptive, non-toxic, semi-rigid, completely perforated, plastic plate the dimensions of the perforations being suitable to prevent clogging and small enough to prevent baby fish from swimming through, said plate being vertically positioned between the walls and adjacent a bottom portion of the aquarium, a pair of rigid plastic channels each of which is positioned against the inner surface of an opposite wall, said channel comprising essentially a flat strip in intimate contact with the inner surface of the aquarium wall, having a pair of slightly concave arms extending perpendicularly from said strip and meeting at a slit-like linear-opening into which the perforated plate is inserted and is held in place by a gripping force of the arms, each channel being removably secured to said walls by means of a clip.

2. A tank divider accessory in accordance with claim 1 wherein a plastic stiffening device is super-imposed on the upper edge of said perforated plate to add rigidity thereto.

3. A tank divider accessory in accordance with claim 1 wherein the perforated plate contains approximately 32 perforations per square inch, each perforation having a diameter of about 0.005 to 0.059 inch.

References Cited by the Examiner

UNITED STATES PATENTS

| 1,838,215 | 12/1931 | De Clairmont | 119—5 |
| 2,885,091 | 5/1959 | Van Pelt | 220—22 X |
| 3,149,608 | 9/1964 | Murphy | 119—5 |

FOREIGN PATENTS 187,882  11/1922  Great Britain.

SAMUEL KOREN, *Primary Examiner.*

HUGH R. CHAMBLEE, *Examiner.*